United States Patent [19]

Novak

[11] 4,274,929
[45] Jun. 23, 1981

[54] CHEMICAL REMOVAL OF SILICON FROM WASTE BRINE STREAM FOR CHLOR-ALKALI CELL

[75] Inventor: Donald S. Novak, Chardon, Ohio

[73] Assignee: Diamond Shamrock Corporation, Dallas, Tex.

[21] Appl. No.: 161,937

[22] Filed: Jun. 23, 1980

[51] Int. Cl.³ .............................................. C25B 1/46
[52] U.S. Cl. ...................................... 704/98; 204/128
[58] Field of Search ................................. 204/98, 128

[56] References Cited

U.S. PATENT DOCUMENTS

| 642,023 | 1/1900 | Vis | 204/98 |
|---|---|---|---|
| 703,289 | 6/1902 | Moore | 204/98 |
| 3,401,015 | 9/1968 | Ninger et al. | 423/331 |
| 3,847,762 | 11/1974 | Strain | 204/98 |
| 4,049,780 | 9/1977 | Neumann | 423/331 |

FOREIGN PATENT DOCUMENTS 40-16325 3/1965 Japan ........................ 423/331

Primary Examiner—R. L. Andrews
Attorney, Agent, or Firm—John P. Hazzard

[57] ABSTRACT

Reduction of silicate levels in alkali metal choride containing industrial waste streams to less than 20 ppm provides waste brine streams suitable for use in the electrolytic production of chlorine and alkali metal hydroxide.

7 Claims, 4 Drawing Figures

Mg ADDED (mg/l)

MIXING AND SETTLING TIME (HOURS)
AFTER CAUSTIC ADDITION

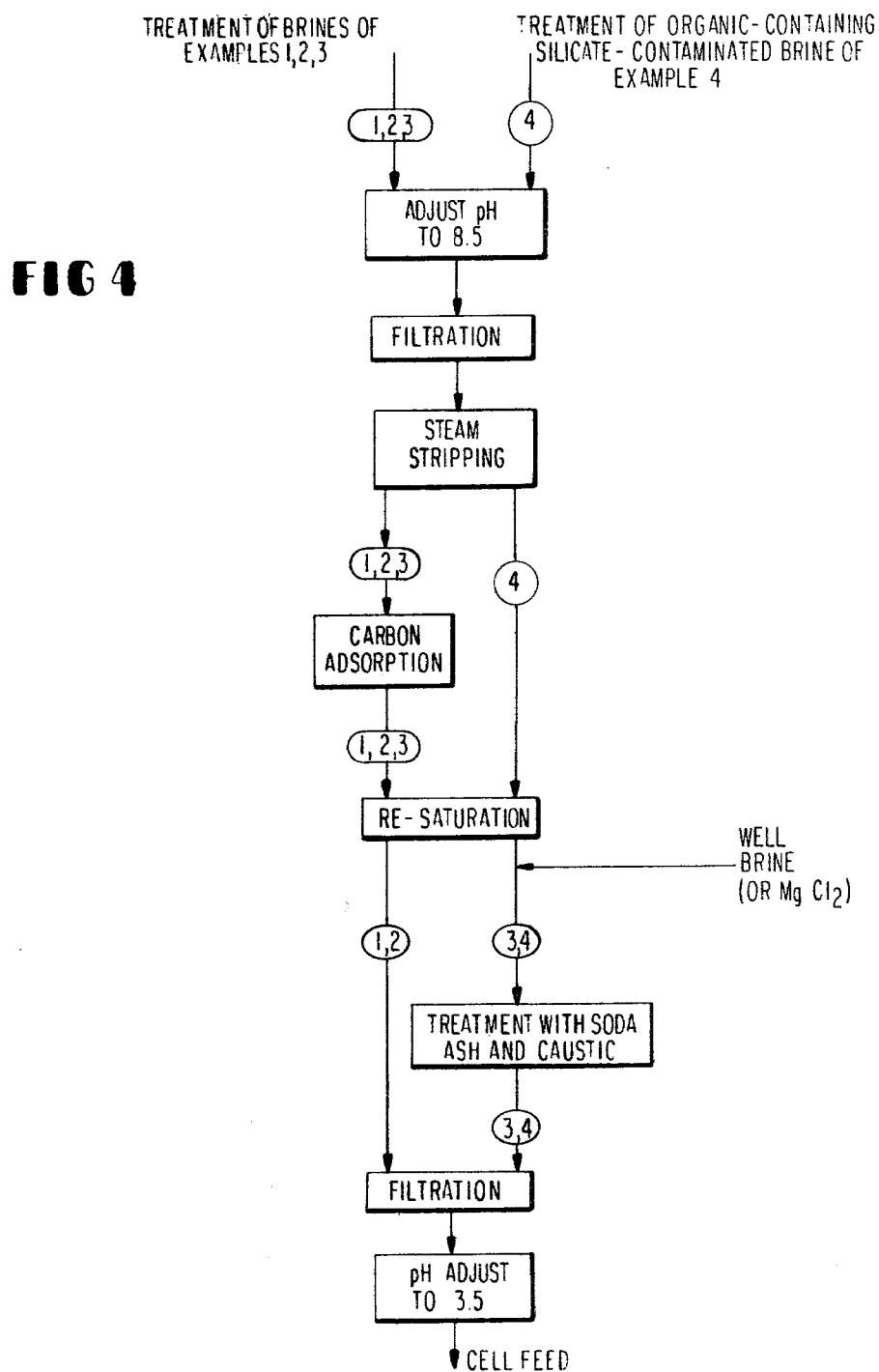

CHEMICAL REMOVAL OF SILICON FROM WASTE BRINE STREAM FOR CHLOR-ALKALI CELL

BACKGROUND OF THE INVENTION

The invention is generally directed to purification and to recovery of waste streams containing high alkali metal chloride levels ("waste brine stream") and to use of those waste brine streams in conventional chlor-alkali diaphragm cells.

Electrolytic production of chlorine and alkali metal hydroxide conventionally involves the electrolysis of aqueous solutions of an alkali metal chloride in cells equipped with diaphragms made entirely or largely of asbestos. Conventional asbestos diaphragms used in these cells generally have an on line lifetime of about twelve months in a commercial scale of electrolytic process.

For economic and environmental reasons, it is desirable to cycle aqueous alkali metal chloride containing industrial waste streams to electrolysis processes undertaken in conventional chlor-alkali cells.

In attempts to electrolyze certain high level alkali metal chloride containing waste streams, from other industrial processes, severe swelling and plugging of the asbestos diaphragm with attendant voltage increases and efficiency losses, occurred within days of the beginning of the operation. At each occurrence of this swelling and consequent plugging of the asbestos diaphragm, the cell operation had to be shut down to wash the asbestos diaphragm to free it of those substances which caused the swelling and consequent plugging.

SUMMARY OF THE INVENTION

It has been discovered that the source of the swelling and plugging of the asbestos diaphragm is due to silicone oxides, specifically silicates of the formula $SiO_x^{n(-1)}$ including both the meta- and ortho-silicates. These silicates in the cell feed to a chlor-alkali cell, although not harmful to the conditions of the commercial process from which the high level alkali chloride waste streams are derived, result in the shutdown of the chlor-alkali cell, because the silicates cause the diaphragm to swell and to plug. Accordingly, the present invention resides in the recognition that certain levels of silicates in alkali metal chloride feeds for chlor-alkali cells rendered the asbestos diaphragm used in the cell inoperative, and the invention includes a process for reducing the silicate content of the waste stream, containing high alkali metal chloride content, to a level sufficiently low not to interfere with the performance of the asbestos diaphragm of the chlor-alkali cell. The process of the invention comprises treating the silicate containing aqueous alkali metal chloride solution with a soluble salt of magnesium and reducing the silicate level in said solution by precipitating the silicates as magnesium silicates.

The invention thus permits the use of commercial waste brine streams containing high levels of alkali metal chloride and silicates in conventional asbestos diaphragmm equipped chlor-alkali cells. Accordingly, the invention maximizes the efficiency of the commercial process from which the alkali metal chloride waste stream derives by using the waste brine stream to produce useful products and at the same time provides an environmentally acceptable method of disposing of the waste brine stream. That is, the invention permits alkali metal chloride waste streams containing silicates to be freed of the harmful silicate content simply without the use of noxious chemicals which themselves must be discarded, and then these treated waste brine streams can be used in a conventional commercial electrolytic process for producing chlorine and alkali metal hydroxide without adversely affecting the efficiency of the process.

DETAILED DESCRIPTION OF THE INVENTION

It has been discovered that plugging and swelling of the asbestos diaphragm of the chloralkali cell will occur during operation of the cell when the cell feed contains about 20 ppm (20 mg./l.) Si (elemental) present as silicates. Accordingly, it is desirable to reduce the Si content of the chlor-alkali cell feed to less than about 20 ppm. Preferably, the Si content is reduced to less than about 10 ppm (10 mg./l.), as at this Si content level, the effect of the degree of swelling of the asbestos-containing diaphragm is substantially eliminated.

To reduce the Si content to these levels, the alkali metal chloride waste stream containing Si as soluble silicates is treated with a magnesium compound which is soluble in the waste brine stream, and the silicates are then precipitated as magnesium silicates. The soluble magnesium compound, usually a soluble magnesium salt, may be in solid or in solution form. The soluble magnesium compound used to treat the alkali metal stream may be magnesium chloride, which advantageously will not contaminate the waste brine stream with additional ionic species. However, any brine soluble magnesium compound or salt is effective in achieving the object of the purification. Conveniently, waste brine streams containing soluble magnesium valves may be used in the process of the invention.

The amount of soluble magnesium compound which is added to the waste brine stream is generally at least about stoichiometric with respect to the silicates present. The amount of the soluble magnesium compound may be in excess of the stoichiometric amount without disadvantage and can, in fact, increase the amount of silicates removed from the stream. Amounts of soluble magnesium compound in excess of the stoichiometric amount can also serve the advantage of reducing any trace metals content which may be additionally present in the waste brine stream. Soluble calcium values may be present in the soluble magnesium compound source and may also act to precipitate silicates advantageously and to effect flocculation of any organic contaminates in the waste brine stream, which are additional advantages in accordance with process of the invention.

After addition of the soluble magnesium compound to the waste brine stream, the silicates are precipitated as magnesium silicates. Precipitation can be effected by adjusting the pH of the waste brine stream containing the soluble magnesium compound from about 10 to about 11.5 to initiate precipitation of the magnesium silicates. Preferably, the pH for precipitating the silicates is adjusted to at least about 11, and thus the preferred pH range is from about 11 up to about 11.5.

The pH adjustment of the waste brine stream may be affected by addition of sodium hydroxide, sodium carbonate or mixtures thereof. Addition of sodium hydroxide is advantageous in that the waste brine stream will not be contaminated with ionic species in addition to those produced during subsequent electrolysis. In the conventional process for purifying brines for chlor-alkali cells, sodium hydroxide and sodium carbonate are added to the brine to remove undesirable impurities, and it is convenient to use this alkaline treatment to adjust the pH of the magnesium treated silicate containing waste brine stream.

After pH adjustment, the treated waste brine stream can be allowed to stand with, or without, mixing for a period of time sufficient to maximize precipitation of the silicates as magnesium silicates. The magnesium silicates are removed from the supernatant by settling or by clarification with decantation or filtration.

After separation of the insoluble silicates, the resulting waste brine stream is substantially free of silicates and is ready for use as a feed to the chlor-alkali cell. Prior to feeding the waste brine stream to the chlor-alkali cell, the pH of the waste brine stream is adjusted to an acid pH.

The following Description of the Drawings with further illustrate the invention to those skilled in the art with respect to the parameters of the process discussed above.

DESCRIPTION OF THE DRAWINGS

FIG. 4 is a flow chart of the process set forth in the Experimental and in the Examples described below.

DESCRIPTION OF EMBODIMENTS OF THE INVENTION

Figure 1:
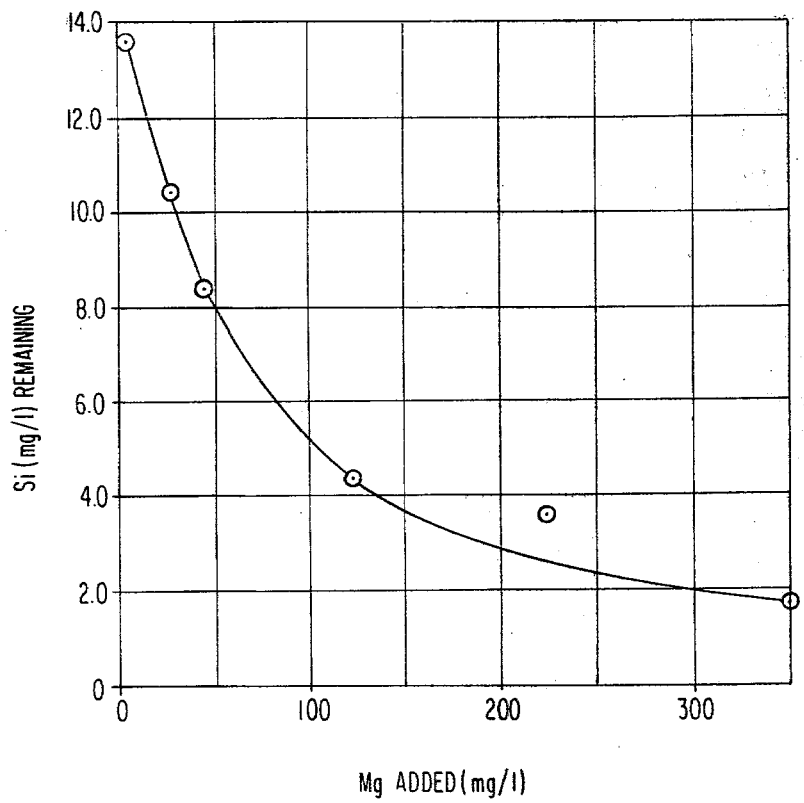
FIG. 1 shows the effect of adding soluble magnesium compound to the silicate containing brine stream in excess of the stoichiometric amount of magnesium compound, based on the silicate content of the brine stream. The graph of FIG. 1 is a plot of the silicate content remaining in the silicate containing brine stream, after purification in accordance with the invention, as a function of the amount of soluble magnesium compound used to treat the silicate containing brine stream. The tests and experiments which are recorded in the graph of FIG. 1 were performed with a saturated brine; reaction time for the soluble magnesium compound treatment of the brine was 30 minutes; the pH of the brine was maintained at 11°, at 22° C., for precipitating the magnesium silicates.
Figure 2:
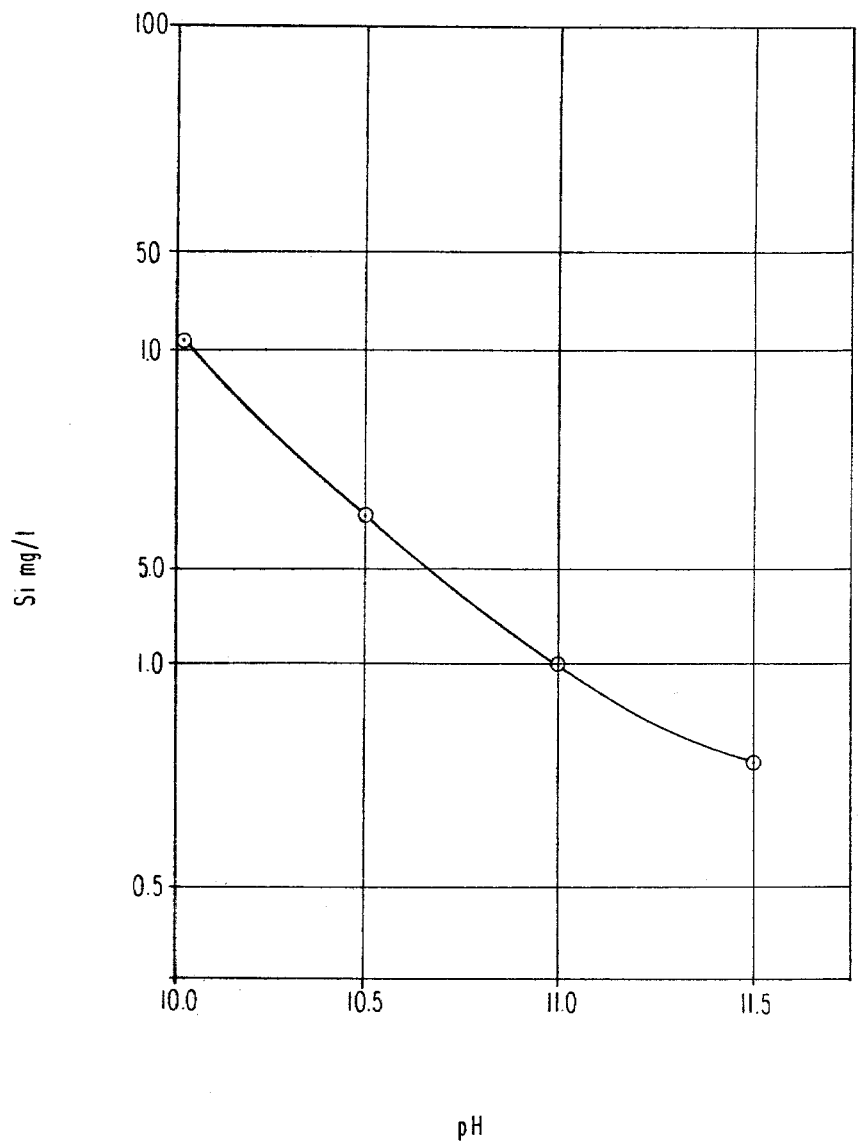
FIG. 2 is a graph of the concentration of silicates remaining in the brine, after treatment and purification in accordance with the invention, as a function of the pH of the step to precipitate the magnesium silicates. The measurements in this graph were made on a brine which had been treated with stoichiometric excess of soluble magnesium compound and then treated with both sodium carbonate (1.0 g./l. excess) and sodium hydroxide (0.3 g./l. excess), to precipitate the magnesium silicates; the treated brine was allowed to stand for 30 minutes and then filtered at 22° C. through a filter having average pore sizes of about 0.2 microns. Under these conditions slightly more than 10 ppm Si remained in the brine when precipitation of the magnesium silicates was undertaken at a pH of 10. The brine contained about 1.0 ppm Si when precipitation of the magnesium silicates was conducted at a pH of 11. As can be seen from the graph of FIG. 2, the decrease in Si content of brines treated in accordance with the invention, as a function of pH, starts to level off at pH of about 11.
Figure 3:
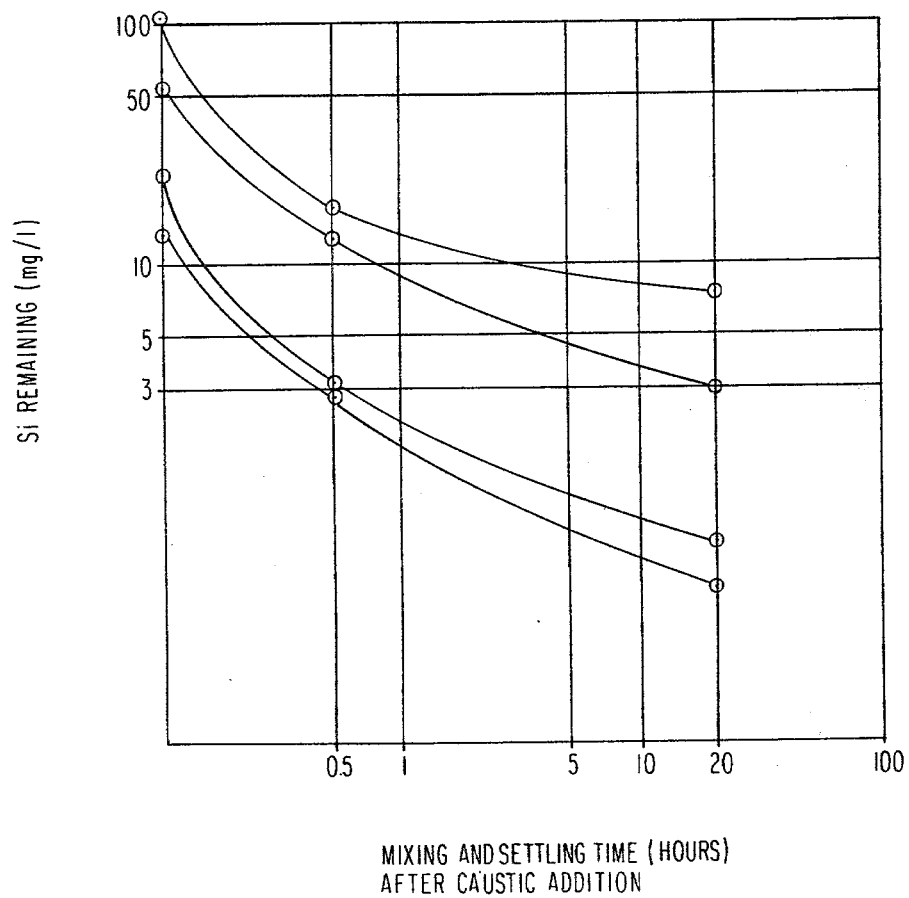
FIG. 3 shows the affect of the duration of the time period allowed for mixing and/or settling after the magnesium silicates precipitation step on the Si content of the brine. The graph of FIG. 3 indicates that longer settling times maximize the amounts of magnesium silicates which are precipitated and separated.

When the process of the invention is undertaken on a large scale, the source of the soluble magnesium compound which is used to reduce silicate contents of brine waste streams can conveniently be a "raw brine", sometimes referred to as "well brine". "Well brines" contain soluble magnesium in varying concentrations; generally, the magnesium content can vary from as low as about 10 ppm up to about 600 ppm magnesium compounds (calculated as elemental magnesium). In addition, well brines contain other metallic values and generally contain from about 1 to 200 ppm strontium (calculated as elemental strontium), 1 to 10 ppm aluminum (calculated as elemental aluminum), 100 to 6000 ppm calcium (calculated as elemental calcium), and from about 0.1 to about 10 ppm of other metal impurities (calculated as elemental metal).

After addition of the soluble magnesium compound to the brine waste stream, the precipitation of the silicates can be conveniently undertaken by adding the sodium carbonate and sodium hydroxide, the conventional brine purification reagents. Preferably, both reagents in solution form are added simultaneously. The simultaneous addition of both the sodium hydroxide and sodium carbonate optimizes crystal growth during precipitation and separation stages of the process.

EXPERIMENTAL

The invention will be illustrated by the following examples. In the following examples, the source of the untreated silica-containing chloralkali brine feed was a typical waste brine stream. A well brine containing soluble magnesium salt was used as the source of magnesium.

When the source of chlor-alkali brine feed containing silica contaminant also contains organic compound and/or polymer contaminants, the process preferably includes steps to reduce the organic contaminant content of the waste stream. For treatment of the silica containing organic-containing waste brine stream the following steps are recommended:

(1) adjusting the pH of the waste brine stream to about 8.5; (2) filtering insolubles; (3) steam stripping the filtered stream; (4) optionally treating the stream with carbon in a carbon absorption step; (5) saturating the stream with sodium chloride; (6) combining the stream with the well brine; (7) treating the stream with soda ash and caustic; (8) filtering to remove precipitates; and (9) adjusting the pH of the treated stream for introduction into the chlor-alkali cell. These procedures are the subject of the flow chart of FIG. 4. This recommended scheme has been followed in Example 3 below; deviation from the recommended scheme in Examples 1, 2 and 4 will be explained in the respective examples. Of course, the exact sequence and nature of the steps for removing organic contaminants can be varied according to the exact source of the silica containing brine which is treated in accordance with the invention.

EXAMPLE 1

In this example, three pilot 5×5 diaphragm cells were employed, each of which was equipped with an asbestos diaphragm containing 20% Teflon fibers. Dimensionally stable anodes were operated in the expanded mode at 1.46 amperes/in.$^2$.

The cell feed was treated in accordance with the steps outlined above except for steps (6) and (7); in other words, the streams were not treated to remove silica contaminant, in accordance with the invention, prior to electrolysis in an asbestos diaphragm cell. The cell feed contained 311 g./l. NaCl; 4 mg./l. organic contaminants; 24 mg./l. Si; 3.5 mg./l. Ca; 0.1 mg./l. Mg; 0.04 mg./l. Fe; and 0.8 mg./l. Al. The ph of the cell feed was adjusted to 3.5.

One of the cells, used as a control cell, was fed C.P. brine. The control cell operated at 3.07 volts, 95.5% cathode current efficiency (C.C.E.), 6" head, 123 g./l. NaOH and 0.1 g./l. $NaClO_3$.

The other two cells were fed the silica-containing cell feed. The diaphragm became plugged and, over the first three days on line (DOL), voltage, efficiencies, and heads changed significantly, as noted in the data below:

|  | Cell 1 | | | Cell 2 | | |
|---|---|---|---|---|---|---|
| DOL | 1 | 2 | 3 | 1 | 2 | 3 |
| Voltage | 3.10 | 3.23 | 3.31 | 3.11 | 3.27 | 3.32 |
| % C.C.E. | 92.5 | 95.8 | 97.2 | 94.1 | 94.2 | 95.1 |
| Head(in.) | 5 | 11 | 16 | 5 | 10 | 13 |
| NaOH(g./l.) |  | 145 |  |  | 130 |  |
| $NaClO_3$(g./l.) |  | 1.1 |  |  | 1.1 |  |

After these runs, chemically pure (C.P.) brine feed was fed to the cell. As a result, voltages and efficiencies returned to start up values, and heads dropped off to nine inches. Finally, chemically pure brine was doped with 23 ppm Si and fed to the two cells; the same plugging effect occurred as in the first run in each of these two cells.

EXAMPLE 2

The same type of diaphragm cell, as used in Example 1, was used in this experiment.

The brine cell feed was treated as in Example 1 and thus contained Si; the Si content of the cell feed was 21.5 ppm. Analysis of the cell feed revealed that it contained 310 g./l. NaCl; 21.5 mg./l. Si; less than 0.02 mg./l. Al; 0.4 mg./l. Ba; 9.3 mg./l. Br; and 1.2 mg./l. Sr; its pH was adjusted to 3.5.

The diaphragm became plugged within 5 days from the beginning of the run, and plugging was accompanied by voltage escalation, as shown in the following data:

| DOL | 1 | 5 |
|---|---|---|
| Voltage | 3.12 | 3.34 |
| % C.C.E. | 92.0 | 89.7 |
| Head (in.) | 5 | 15 |
| NaOH (g./l.) | 133 | — |
| $NaClO_3$ (g./l.) | 0.6 | — |

EXAMPLE 3

In this example, the cell feed had been subjected to all steps 1–9, described above under the heading "Experimental". Unlike the cell feeds in Examples 1 and 2 above, the well brine containing magnesium was used to pretreat the cell feed; the pretreatment resulted in reduction of the Si content level to 6.5 ppm. Analysis of the cell feed for this experiment indicated that it contained 302 g./l. NaCl; 0.04 g./l. NaOH; 1.6 g./l. $Na_2CO_3$; 47 mg./l. organic contaminants; 6.5 mg./l. Si; 1.4 mg./l. Ca; less than 0.16 mg./l. Mg; less than 0.1 mg./l. Fe; and less than 0.06 mg./l. Al. By comparison, the waste brine stream, after carbon treatment and prior to steps 5–9, was analyzed and contained 307 g./l. NaCl; 0.2 g./l. $Na_2CO_3$; 69 mg./l. organic contaminants; 12 mg./l. Si and less than 0.7 mg./l. Al.

The cell used in this experiment was a 5×5 diaphragm cell. The diaphragm used in the cell was porous, holding a 2" head. Prior to subjecting the cell feed containing 6.5 ppm Si to electrolysis in the cell, a C.P. brine was fed to the cell for two days to line out the cell.

No adverse effects were seen during this example; the data for this example are recorded below:

| Days on Line | 1 | 2 | 3 | 4 | 8 | 9 | 11 |
|---|---|---|---|---|---|---|---|
| Voltage | 3.03 | 3.04 | 3.07 | 3.09 | 3.07 | 3.05 | 3.07 |
| % C.C.E. | 88.7 | 90.3 | 92.8 | 90.4 | 89.6 | 86.5 | 89.3 |
| Head (in.) | 2 | 2 | 2 | 2 | 2 | 1.5 | 2 |
| NaOH (gpl) | 140 | 142 | 134 | 135 | 140 | 149 | 146 |
| $NaClO_3$ (gpl) | 0.9 | 0.9 | 0.9 | 1.1 | 1.3 | 1.5 | — |

A second run was conducted in this cell, using the same diaphragm. In the second run a brine containing 20 ppm Si contaminant was the cell feed. In this second run, plugging effects of the asbestos diaphragm were noticed after 5 days of operation. The initial diaphragm porosity is related to the rate at which plugging of the diaphragm will occur with brines containing 20 ppm Si impurity levels.

EXAMPLE 4

This example was conducted to demonstrate the possibility of eliminating the carbon absorption step 4 in the process outlined above under the heading, "Experimental". Accordingly, the cell feed was the product isolated after subjecting an organic-containing waste stream to steps 1–3 and then steps 5–9, but omitting step (4). The cell feed did contain the highest total organic compound and/or polymer content (360 mg./l.) of the examples. This cell feed was faintly yellow in appearance. However, the organic content of this cell feed did not adversely affect the operation of the cell after two weeks of operation. The analyses of the organic-containing waste stream at various stages of treatment to produce the cell feed for this experiment are set forth below:

TABLE

| STREAM* | BRINE STREAM TREATMENT ANALYSES | | | | | | |
|---|---|---|---|---|---|---|---|
|  | 1 | 2 | 3 | 4 | 5 | 6 | 7 |
| NaCl(g/l) | 159 | 117 | 170 | 303 | 305 | 303 | 303 |
| NaOH(g/l) | 1.2 |  |  |  |  | 0.3 |  |
| $Na_2CO_3$(g/l) | 0.7 |  |  |  |  | 1.9 |  |
| Init. pH |  |  |  |  |  |  |  |
| Feed pH |  |  |  |  |  |  | 3.5 |
| Si(mg/l) |  |  |  |  |  |  | 7.5 |
| Ca(mg/l) | 6.7 | 3.7 | 4 | 3 | 680 | 4 | 6 |
| Mg(mg/l) | 0.7 | 0.7 | 1.5 | 1.3 | 5 | 0.7 | 1.3 |

*Stream 1 is industrial waste stream A; Stream 2 is industrial waste stream B; stream 3 is a mixture of 32% of stream 1 and 68% of stream 2 and was used as the silicate containing brine of Example 4. Stream 4 is stream 3 after filtration; stream 5 is stream 4 after steam stripping; stream 6 is stream 5 after NaCl saturation; stream 7 is stream 6 after being mixed 50:50 with well brine; stream 8 is stream 7 after treatment and filtration, in accordance with the invention; stream 9 is the cell feed for Example 4.

In this example, two 5×5 diaphragm cells were started up and lined out on pure C.P. brine for six days. To one of the cells used as a control, Cell 1 in the data tabulated below, pure C.P. brine was fed throughout the run.

The cell feed containing the organic contaminants in the amount of 360 ppm was subjected to electrolysis in the second cell denoted Cell 2 in the data tabulated below:

| CELL 1 | | | | | | | |
|---|---|---|---|---|---|---|---|
| Days on Line | 1 | 2 | 5 | 6 | 7 | 8 | 11 |
| Voltage | 3.10 | 3.11 | 3.13 | 3.14 | 3.15 | 3.17 | 3.17 |
| % C.C.E. | 89.5 | 92.1 | 92.4 | 91.6 | 88.7 | 95.4 | 92.3 |
| Head (in.) | 3 | 3 | 4 | 4.5 | 4.5 | 5 | 4.5 |
| NaOH(gpl) | 146 | 130 | 131 | 134 | 147 | 107 | 130 |
| NaClO$_3$(gpl) | — | 0.6 | 0.4 | 0.5 | 0.8 | — | — |
| Days on Line | 12 | 14 | 15 | 16 | 17 | 18 | |
| Voltage | 3.17 | 3.18 | 3.18 | 3.20 | 3.22 | 3.19 | |
| % C.C.E. | 94.0 | 94.1 | 94.2 | 92.6 | 92.3 | 93.3 | |
| Head (in.) | 5 | 5.5 | 5.5 | 5 | 5 | 5 | |
| NaOH(gpl) | 119 | 115 | 113 | 126 | 125 | 122 | |
| NaClO$_3$(gpl) | 0.3 | 0.2 | — | 0.3 | 0.4 | — | |
| CELL 2 | | | | | | | |
| Days on Line | 1 | 2 | 5 | 6 | 7 | 8 | |
| Voltage | 3.15 | 3.16 | 3.17 | 3.18 | 3.15 | 3.15 | |
| % C.C.E. | 90.0 | 93.7 | 93.8 | 94.2 | 94.1 | 96.4 | |
| Head (in.) | 3 | 3.5 | 4.5 | 4 | 4.5 | 4.5 | |
| NaOH(gpl) | 147 | 133 | 131 | 128 | 132 | 113 | |
| NaClO$_3$(gpl) | — | 0.4 | 0.3 | 0.3 | 0.4 | — | |
| Days on Line | 12 | 14 | 15 | 16 | 17 | 18 | |
| Voltage | 3.20 | 3.19 | 3.20 | 3.21 | 3.21 | 3.23 | |
| % C.C.E. | 94.5 | 94.3 | 96.3 | 93.1 | 92.0 | 93.5 | |
| Head (in.) | 4.5 | 4.5 | 4.5 | 4 | 4 | 4 | |
| NaOH(gpl) | 125 | 123 | 119 | 130 | 127 | 129 | |
| NaClO$_3$ (gpl) | 0.6 | 0.4 | — | 0.5 | 0.5 | — | |

What is claimed is:

1. A process for reducing the silicate content of an aqueous alkali metal chloride solution containing soluble silicates in an amount in excess of about 20 ppm and for electrolyzing said solution in an electrolytic cell equipped with a diaphragm made at least in part of asbestos, comprising:
    (a) adding at least one soluble magnesium compound to the soluble silicate containing alkali metal chloride solution to establish a concentration of soluble magnesium compound in the solution which is at least about stoichiometric with respect to the concentration of silicates in solution, and
    precipitating the silicates as compounds of magnesium;
    (b) separating the magnesium silicate precipitate from the alkali metal chloride solution; and
    (c) electrolyzing the alkali metal chloride solution, separated from said magnesium silicate precipitate, in said electrolytic cell to produce chlorine and alkali metal hydroxide.

2. The process of claim 1, including adjusting the pH of the soluble silicate containing alkali metal chloride solution from about 10 to about 11.5 after adding at least one soluble magnesium compound to precipitate the silicates.

3. The process of claim 2, including adjusting the pH of said solution from about 11 to about 11.5.

4. The process of claim 2, wherein the pH of said solution is adjusted from about 10 to about 11.5 by adding sodium hydroxide, sodium carbonate, or mixtures thereof to render the magnesium silicates insoluble in the solution.

5. The process of claim 1, wherein said alkali metal chloride is sodium chloride.

6. The process of claim 1, wherein said soluble magnesium compound includes MgCl$_2$.

7. The process of claim 1, wherein said soluble magnesium compound is a well brine containing a soluble magnesium salt.

* * * * *